Feb. 9, 1926.
P. BURKE
1,572,225
CLUTCH OPERATING MEANS
Filed April 28, 1924    3 Sheets-Sheet 3
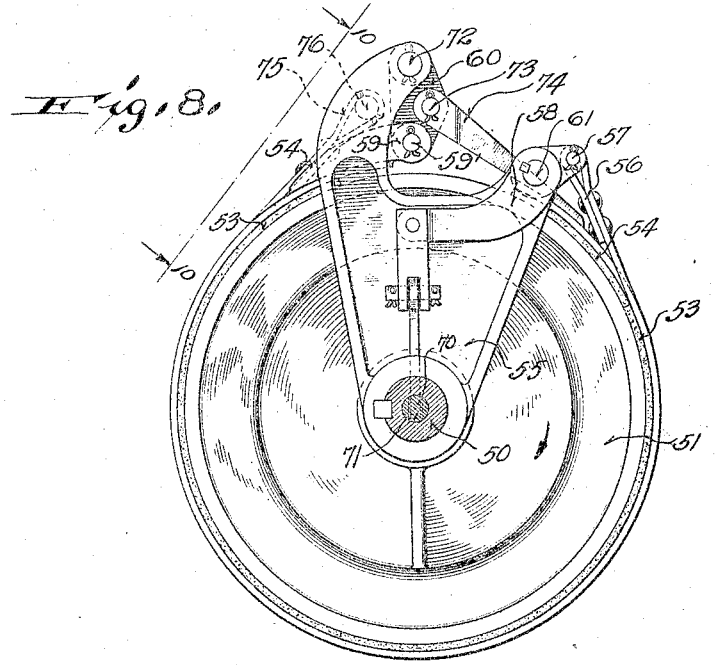
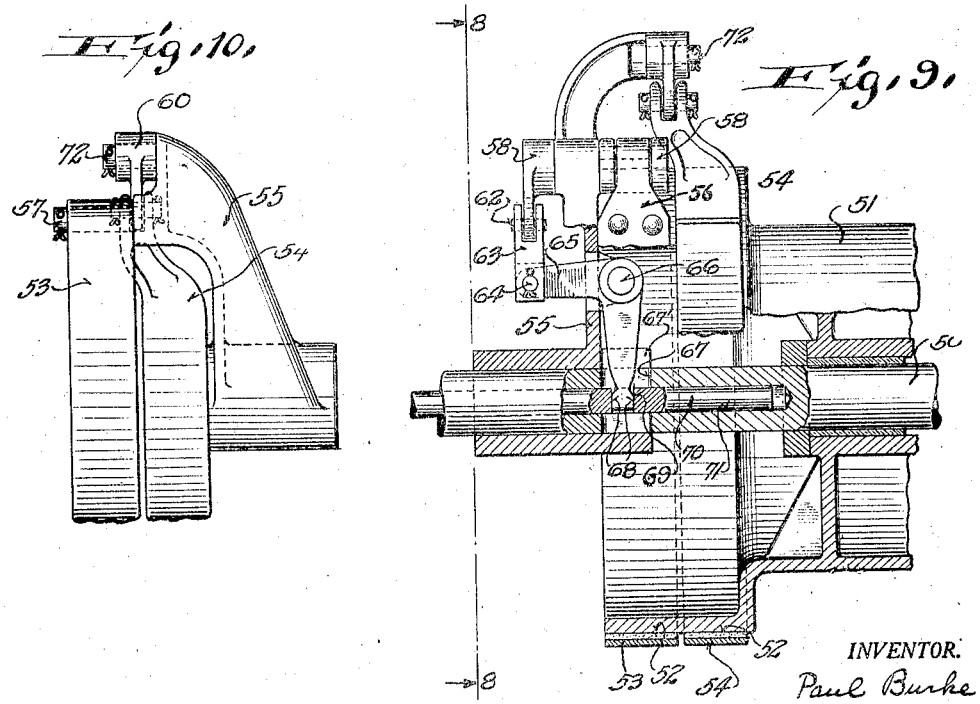
INVENTOR.
Paul Burke
BY
Quarles & French
ATTORNEYS Patented Feb. 9, 1926.

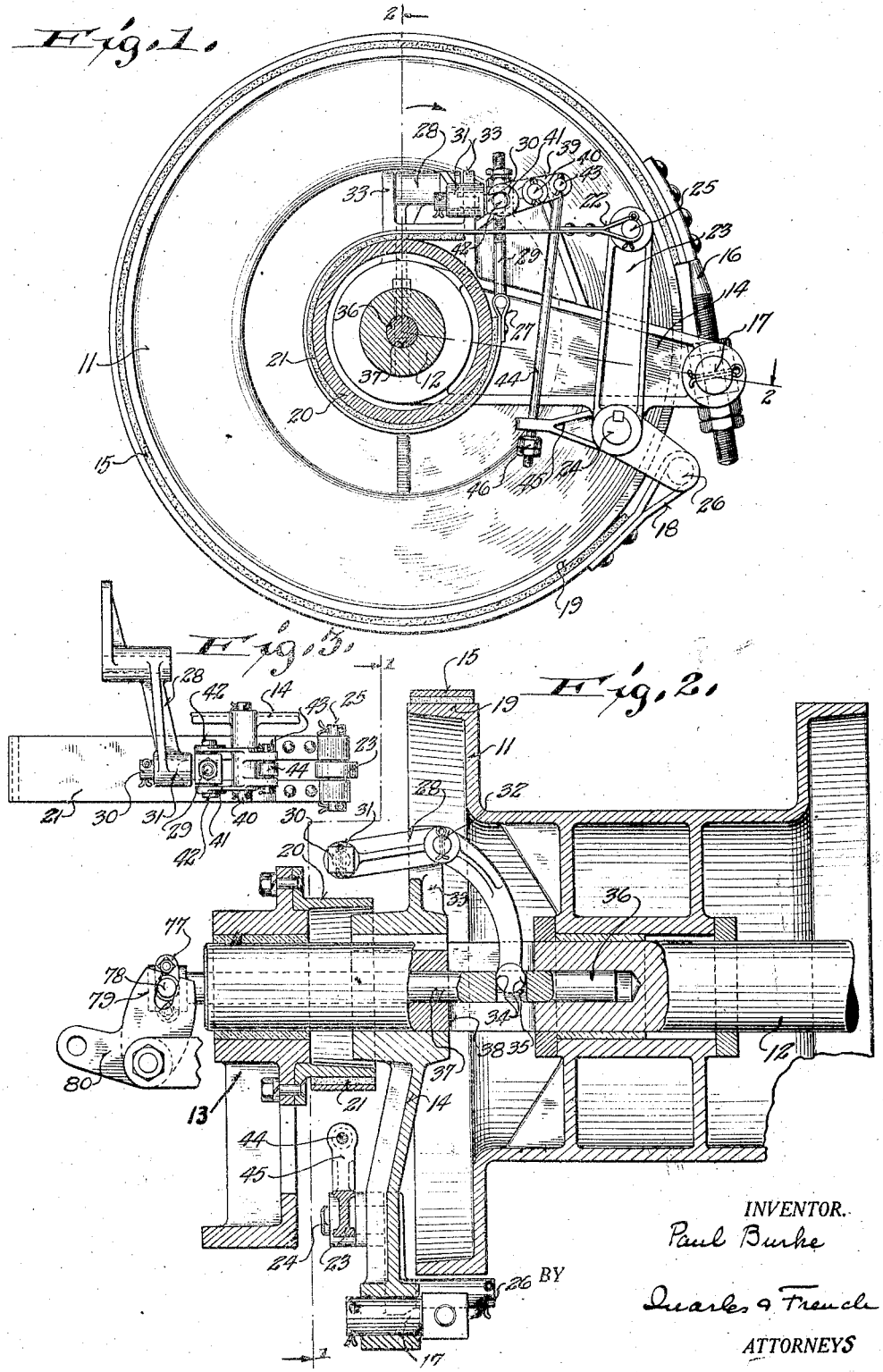

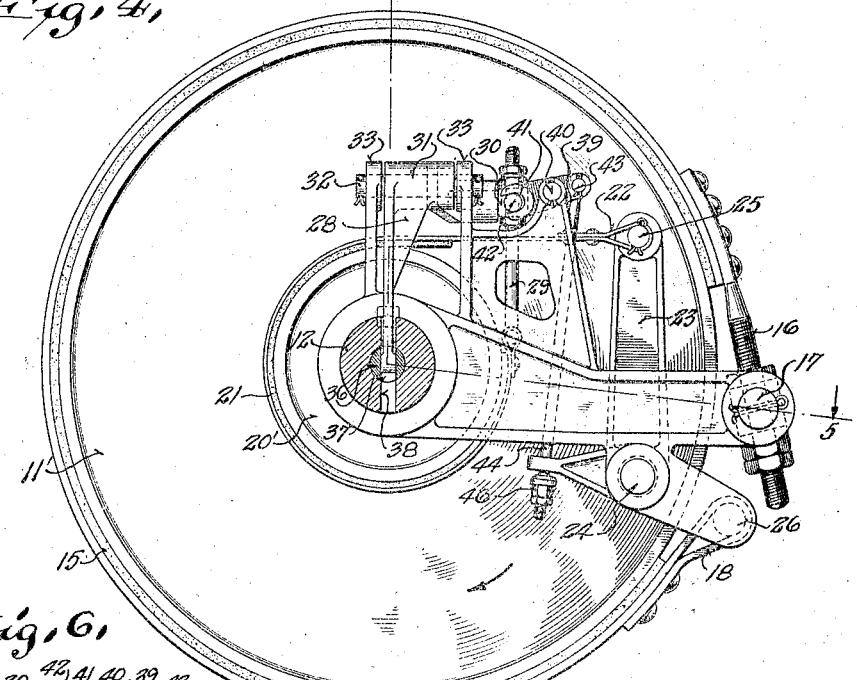

1,572,225

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

CLUTCH-OPERATING MEANS.

Application filed April 28, 1924. Serial No. 709,477.

*To all whom it may concern:*

Be it known that I, PAUL BURKE, a citizen of the United States of America, and resident of Green Bay, in the county of Brown and State of Wisconsin, have invented new and useful Improvements in Clutch-Operating Means, of which the following is a description, reference being had to the accompanying drawings, which are a part of this specification.

The invention relates to clutch-operating mechanism.

In many forms of mechanism there are clutches to be operated which in certain applications involve a greater degree of muscular effort than the average man is capable of without undue fatigue. Thus, in some forms of machinery, particularly hoisting and excavating, it has been rather common practice to use steam or air cylinders for the performance of these operations, the operator's muscular efforts then being reduced to the light duty of opening and closing a suitable valve which in turn controls the ingress to and egress from the cylinder of the steam or air.

The use of fluid-pressure-operated means has certain objections among which may be mentioned the relatively high cost, a certain lack of reliability due to the possibility of freezing in cold weather, and the trouble of maintenance incident to the complication of the fluid control, particularly in such cases where a compressor is used as the means for supplying the pressure fluid.

A further objection to the use of fluid control in many of its forms is the fact that it is difficult or impossible for the operator to accurately control the degree of effort, for the reason that in many forms of fluid control there is little or no relation between the position of the operator's lever or pedal, or the intensity of muscular effort applied to it, and the position of the device moved by the fluid control or the intensity with which such device is actuated.

It is the object of this invention to supply a mechanical means for the adequate reduction of muscular effort for many forms of machine operation and to do so with a minimum of cost and mechanical complication.

It is a further object of this invention to insure that the intensity of the effective effort delivered by the machinery will be in proportion to the intensity of the muscular effort applied.

A further object of the invention is to provide clutch mechanism of the type above specified, with a positive release for the main and servo clutch mechanisms.

The invention further consists in the several features hereinafter set forth and more particularly defined by claims at the conclusion hereof.

In the drawings: Fig. 1 is an end view of the clutch-operating mechanism embodying the invention, the same being taken on the section line 1—1 of Fig. 2;

Fig. 2 is a composite sectional view taken on the line 2—2 of Fig. 1;

Fig. 3 is a detail plan view of part of the mechanism shown in Fig. 1;

Fig. 4 is an end view of a modified form of mechanism embodying the invention, the same being taken on the line 4—4 of Fig. 5;

Fig. 5 is a composite sectional view taken on the line 5—5 of Fig. 4;

Fig. 6 is a detail plan view of part of the mechanism shown in Fig. 4;

Fig. 7 is a detail plan view of the manually operable shifting mechanism;

Fig. 8 is an end view of another form of mechanism embodying the invention, looking from the line 8—8 of Fig. 9;

Fig. 9 is an elevation view of mechanism shown in Fig. 8, parts being broken away and parts being shown in section;

Fig. 10 is a detail plan view of the mechanism viewed from an angle of forty-five degrees from the vertical and looking toward the right of Fig. 8, that is, along the line 10—10 of Fig. 8.

Referring to Figs. 1 to 3, inclusive, I have here shown a drum 11, such as is used on various kinds of machinery for ropes, chains or cables, loose on a power-driven shaft 12 mounted in suitable supporting bearings 13, only one being shown.

The drum 11 is adapted to be driven from the shaft 12 through any suitable form of clutch and I have here shown a clutch of the contracting band type, including a spider or support 14 keyed to the shaft 12 and carrying a clutch member or band 15, one end 16 of which has an adjustable threaded connection with an anchor pin 17 pivotally mounted on the spider, and the other end 18 of which is also carried by the spider in a manner hereinafter described. The band 15 is engaged with a cylindrical peripheral clutch surface 19 of the drum 11 by applying tension to the end 18 thereof, causing a contraction and hence a gripping of said band to the drum to establish a frictional driving engagement therewith.

Bolted to the support 13 is a friction member or drum 20 which is concentric with the shaft 12 and is adapted to be engaged by a friction band 21, one of whose ends 22 is operatively connected to the end 18 of the band 15 through a bell crank lever 23 having its supporting pin 24 pivotally mounted on the spider or support 14 in any suitable manner. The end 22 of the band 21 is connected to a pin 25 on the longer arm of the bell crank lever 23, while the end 18 of the band 15 is connected by a pin 26 to the shorter arm of said lever 23. The other end 27 of the band 21 is operatively connected to a rocker lever 28, as by a T-bolt 29 connected with the looped end of the band and having an adjustable threaded connection with an anchor pin 30 pivotally mounted in a bearing 31 at one end of the lever 28.

The lever 28 is pivotally mounted intermediate its ends upon a pin 32 carried by lugs 33 on the support 14, and at its other end has curved or cam-like surfaces 34 adapted to engage the ends of a slot 35 in a shifter-rod 36 which is slidably mounted in a central bore 37 in the shaft 12 and adapted to be shifted axially by the operator, the shaft 12 having a slot 38 therein to accommodate the movement of the lever 28.

While the machine is running shaft 12 rotates continuously and when it is desired to drivingly connect the drum 11 therewith the operator shifts the rod 36 outwardly, thereby causing the upper end of the lever 28 to swing upwardly and exert a tension on the end 27 of the band, which brings the band 21 into frictional contact with the drum 20, there being relative movement between said drum and band because at that time the band 21 is rotating with the shaft 12 and the drum 20 is stationary.

In accordance with the well-known law which defines the relation between the tensions in the ends of a friction band having relative motion with its drum, a tension in the end 22 of the band will be produced which is substantially greater than that applied at the end 27. In other words, the force of applying the band imparted by the operator is increased by the force transmitted to the band from the shaft 12 through the relative movement of said band and drum, and consequently a greater force is applied by the band to the lever 23 by its connection at its end 22 with said lever, and this greater force is utilized to swing the longer end of said lever toward the shaft 12 and consequently exert a tension in the end 18 of the clutch band 15 and thereby bring said band into frictional driving engagement with the drum 19, whereby said drum will then be driven, through the agencies just described, by the shaft 12, it being further noted that the ratio of the arms of the bell crank 23 also increases the force holding the band 15 against the clutch surface 19 over the force applied by the end of the band 22. Thus, a small force applied by the operator is multiplied through the mechanism above described to bring a much greater force to bear on the clutch so as to move said clutch into engagement with the drum or device to be driven, as it will be understood that the drum is only representative of a device or mechanism to be driven from the shaft 12.

When the shaft 36 is shifted inwardly the tension of the band 21 will be released and in many instances such release is sufficient to disengage the clutch, but a positive release is preferred, and for this purpose I have shown a lever 39 pivotally mounted intermediate its ends on a pin 40 carried by the support 14 and having a forked portion 41 at one end engageable with pins 42 formed on or secured to the anchor pin 30, and having its other end connected by a pin 43 to a rod 44 which extends through an arm 45 keyed to the bell crank lever pin 24, said rod 44 having nuts 46 on its outer end acting as adjustable stops to engage the arm 45 on a downward movement of the lever 28 to a release position through the inward shifting of the shaft 36, this engagement of rod 44 with the arm 45 causing the bell crank lever to swing away from the shaft 12 and hence release the band 15 from the clutch surface 19, at the same time the downward swinging movement of the lever 28 causing the band 21 to be released from the drum 20 due to the downward movement of the T-bolt 29. The release is much more readily effected than the engagement of the clutch and hence the release mechanism shown may be readily actuated by the operator.

The construction shown in Figs. 4 to 6, inclusive, is generally similar to that previously described and has a similar operation so like parts have been given like numerals to those previously described, but instead of having the servo friction band 21 engage with a stationary drum said band coacts with a drum 20' formed as a part of the drum 11' which is otherwise similar to the drum 11 and similarly mounted on the shaft 12. The lever 28 for this construction has its position reversed so as to properly operate the band 21 which is now disposed within the outer flange of the drum, and because of this reversed position of the lever 28 the inward movement of the shifting shaft 36 by the operator acts to draw the band 21 into engagement with the drum 20', and the tension exerted by the operator on this band, together with the torque exerted upon it by the drum 20' because of relative motion between said band and drum, causes a greater tension to be exerted at its end 22 upon the lever 23 which thereupon moves the clutch band 15 into driving engagement with the drum 11'. The same mechanism as shown in the first-described construction is used to obtain a positive release of the clutch, and its servo mechanism and the parts have been similarly designated, such release taking place on the outward movement of the shifting shaft 36, as such movement causes a downward swing of the inner end of the lever 28 and hence a downward release of rod 29 and a swing of lever 23 to release the band 15.

The construction shown in Figs. 8 to 10, inclusive, operates in the same way as that shown in Figs. 4 to 6, inclusive, but with an increased mechanical advantage through the modified arrangement of the servo mechanism. In this construction the power-driven shaft 50, which it will be understood is supported in suitable bearings, has the device to be actuated, such as the drum 51, loosely mounted thereon, said drum having a peripheral clutch surface or surfaces 52.

A servo friction band 53 and a clutch band 54 are operatively connected together and carried on a spider or support 55 keyed to the shaft 50. One end 56 of the band 53 is connected by a pin 57 to one end of a lever 58 and the other end, having a lug 59, is connected by a pin 59' to an end of a lever 60. The lever 58 has its pin 61 pivotally mounted in the support 55 and its arms straddling said support and is pivotally connected at its other end by a pin 62 to one end of a link 63. The other end of said link is pivotally connected by a pin 64 to one arm of a bell crank lever 65 mounted on a pivot pin 66 carried by the support 55. The other arm of said bell crank lever has its ends working in a slot 67' in the spider and in a slot 67 in the shaft 50, and provided with cam-like surfaces 68 engageable with the ends of a slot 69 in a shifting shaft 70 slidably mounted in an axial bore 71 in the shaft 50, and under the control of the operator, whereby shifting said shaft 70 inwardly will, through the connections above described, put tension on the end 56 of the band and bring it into operative engagement with the surface 52 of the drum, thereby causing a greater force to be applied to the lever 60.

The lever 60 is pivotally mounted at its upper end on a pin 72 carried by the support 55 and is connected intermediate its ends by a pin 73 to the end 74 of the band 54. The other end 75 of the band is dead-ended on the support 55 as by connection with a pin 76 carried thereby.

With this construction, with the shaft 50 continuously rotating in the direction of the arrow, when the band 53 is brought into frictional engagement with the clutch surface 52 by the operator, as previously described, the relative motion between the rotating band and the drum causes a tension to be produced in the band which is transmitted as a force to swing the free end of the lever 60 toward the left, thereby pulling the end 74 of the band 54 toward the left and bringing said band 54 into driving engagement with the drum. As the end 74 of the band 54 is mounted between the pin 72 and the end 59 of the band 53, an increased leverage will result. The movement of the shifting member 70, by the operator, in the opposite direction causes a release of the band 53 and a swinging of the lever 60 toward the right causes a release of band 54 from the drum.

In all of the constructions above described, it will be noted that the shifting member rotates with the power-driven shaft, and in Figs. 2, 5 and 7 I show a collar 77 loosely mounted on the rod 36 and having projecting pins 78 engaged by the forks 79 of a bell crank 80 which is pivotally supported on a relatively stationary support and is adapted to be connected in a well-known manner to a lever or pedal (not shown) adapted to be moved to and fro by the operator. This same means may be used with the shaft 70 shown in Fig. 9.

It will also be noted that each of the bands is provided with a suitable friction lining From the foregoing description it will be noted that by the operation of the operator of the servo friction band mechanism the power of the driving shaft is used to augment the force applied by the operator to operate the main clutch mechanism, and that the intensity of the force applied to operate the main clutch mechanism will be in proportion to the force applied by the operator in operating the servo mechanism, since the tension produced by the servo friction clutch is augmented in proportion to the tension produced on said clutch by the operator. Thus, a force which the operator can readily apply to the servo friction clutch mechanism, without undue strain, is augmented by the driving force of the machine to perform the heavy duty of operating the main clutch mechanism.

While I have mentioned the manual operation of the servo mechanism by the operator, it will be understood that I deem any mechanism which will perform the light duty imposed upon the operator as an equivalent, in a broad sense, of a manual operation.

I desire it to be understood that this invention is not to be limited to any particular form or arrangement of parts except in so far as such limitations are included in the claims or necessitated by the prior art.

What I claim as my invention is:

1. In a machine, the combination with a power-driven shaft and a member to be driven, of a main friction clutch mechanism for drivingly connecting said member with said shaft, a servo friction clutch mechanism under the control of the operator and operatively connected to said main clutch mechanism and to said shaft for operating said main clutch mechanism through the force applied in making an application augmented by the power which it receives from said shaft, and means associated with both of said clutch mechanisms for positively releasing the same.

2. In a machine, the combination with a power-driven shaft and a member to be driven, of a main friction clutch mechanism for drivingly connecting said member with said shaft, a servo friction clutch mechanism under the control of the operator and operatively connected to said main clutch mechanism and to said shaft for operating said main clutch mechanism through the force applied in making an application augmented by the power which it receives from said shaft, and means operable on the release of said servo clutch mechanism for positively releasing the main clutch mechanism.

3. In a machine, the combination with a power-driven shaft and a member to be driven, of a main clutch band normally and positively revolving with said shaft for drivingly connecting said member with said shaft, a servo clutch band normally and positively revolving with said shaft and operatively connected thereto and to said main clutch band, said member provided with frictional surfaces for engagement of said bands, and manually operated means for directly applying the servo band to said member.

4. In a machine, the combination with a power-driven shaft and a member to be driven, of a main friction clutch mechanism including a friction band for drivingly connecting said member with said shaft, a servo friction clutch band under the direct control of the operator, a support for both clutch bands positively revolving with said shaft, means, actuated by the operator, for directly effecting the tensioning of said servo clutch band, and means including a lever mounted on said support for transmitting the tension set up in said servo clutch band to said main clutch band to apply the latter.

5. In a machine, the combination with a power-driven shaft and a member to be driven, of a main friction clutch mechanism including a friction band for drivingly connecting said member with said shaft, a servo friction clutch band under the direct control of the operator, a support for both clutch bands positively revolving with said shaft, means, actuated by the operator, for directly effecting the tensioning of said servo clutch band, and means including a lever mounted on said support for transmitting the tension set up in said servo clutch band to said main clutch band and of a type to increase the force applied to the main clutch band over the force said lever receives from said servo band.

6. In a machine, the combination with a power-driven shaft and a member to be driven, of a main friction clutch mechanism having an engaging part for drivingly connecting said member with said shaft, a servo friction clutch mechanism having an engaging part under the control of the operator, a support for the engaging parts of both clutch mechanisms revolving with said shaft, manually operated means for associating the engaging part of the servo clutch mechanism with said member to receive power from said shaft, means including a lever for transmitting the power from the servo clutch mechanism to the engaging part of the main clutch mechanism to apply the latter, and release mechanism operable on the release of the engaging part of the servo clutch mechanism for moving said lever to positively release the engaging part of the main clutch mechanism.

7. In a machine, the combination with a power-driven shaft and a member to be driven, of a main friction-band type clutch mechanism for drivingly connecting said member with said shaft, a servo friction-band type clutch mechanism, means including a lever for operatively connecting the bands of said clutch mechanisms together whereby tension in the band of the servo clutch mechanism from power derived through said shaft is exerted upon said lever to apply the band of said main clutch mechanism, the bands of both clutch mechanisms being mounted to normally and positively revolve with said shaft, and manually operated means for making a direct application of the servo clutch mechanism.

8. In a machine, the combination with a power-driven shaft and a member to be driven, of a main friction-band type clutch mechanism for drivingly connecting said member with said shaft, a servo friction-band type of clutch mechanism, means including a lever for operatively connecting the bands of said clutch mechanisms together whereby tension in the band of the servo clutch mechanism from power derived through said shaft is exerted upon said lever to apply the band of said main clutch mechanism, the bands of both clutch mechanisms being mounted to normally and positively revolve with said shaft, manually operated means including a lever revolving with said shaft and connected to the band of the servo clutch mechanism, and a shiftable member positively revolving with said shaft and controlled by the operator and concentrically disposed with respect to said shaft.

9. In a machine, the combination with a power-driven shaft, of a member to be driven having coaxial frictional clutch surfaces thereon, of clutch bands normally and positively revolving with said shaft and engageable with said surfaces, manually operated means for directly applying one of said clutch bands to its clutch surface, and a connection between said last-named band and the other band for moving said other band into engagement with its clutch surface.

10. In a machine, the combination with a power-driven shaft, of a member to be driven having coaxial frictional clutch surfaces thereon, of clutch bands revolving with said shaft and engageable with said surfaces, manually operated means for moving one of said clutch bands into engagement with its clutch surface, a connection between said last-named band and the other band for moving said other band into engagement with its clutch surface, and means for positively releasing said bands from engagement with their clutch surfaces.

11. In a machine, the combination with a power-driven shaft and a member to be driven, of a main friction clutch mechanism for drivingly connecting said member with said shaft, a servo friction clutch mechanism, a connection between said clutch mechanisms whereby the latter operates the former, operator-controlled means for applying and releasing said servo clutch mechanism, and a connection between said first-named connection and said operator-controlled means for effecting a positive release of the main clutch mechanism.

12. In a machine, the combination with a power-driven shaft and a member to be driven, of a main friction clutch mechanism for connecting said member to said shaft including a friction-band, a servo friction clutch mechanism including a friction-band, means including a lever operatively connecting said bands whereby the latter operates the former, control means actuated by the operator for applying and releasing said servo friction-band, and means connecting said control means with said lever to effect a positive release of the friction-band of the main clutch mechanism.

13. In a machine, the combination with a power-driven shaft and a member to be driven, of a main friction clutch mechanism for drivingly connecting said member with said shaft, a servo friction clutch mechanism, a connection between said clutch mechanisms whereby the latter operates the former, operator-controlled means for applying and releasing said servo clutch mechanism, and means associated with said operator-controlled means and actuated thereby to positively release the main clutch mechanism.

14. In a machine, the combination with a power-driven shaft and a member to be driven, of a main friction clutch mechanism including a friction-band for drivingly connecting said member with said shaft, a servo friction clutch mechanism including a friction-band, means operatively connecting said bands whereby the latter operates the former, operator-controlled means for applying and releasing the band of said servo clutch mechanism, and means associated with said operator-controlled means and actuated thereby to positively release the band of the main clutch mechanism.

In testimony whereof, I affix my signature.

PAUL BURKE.